July 22, 1952 — H. C. PERSONS — 2,603,784
NIGHT VISOR BLACKOUT GLARE DEVICE
Filed Sept. 22, 1951
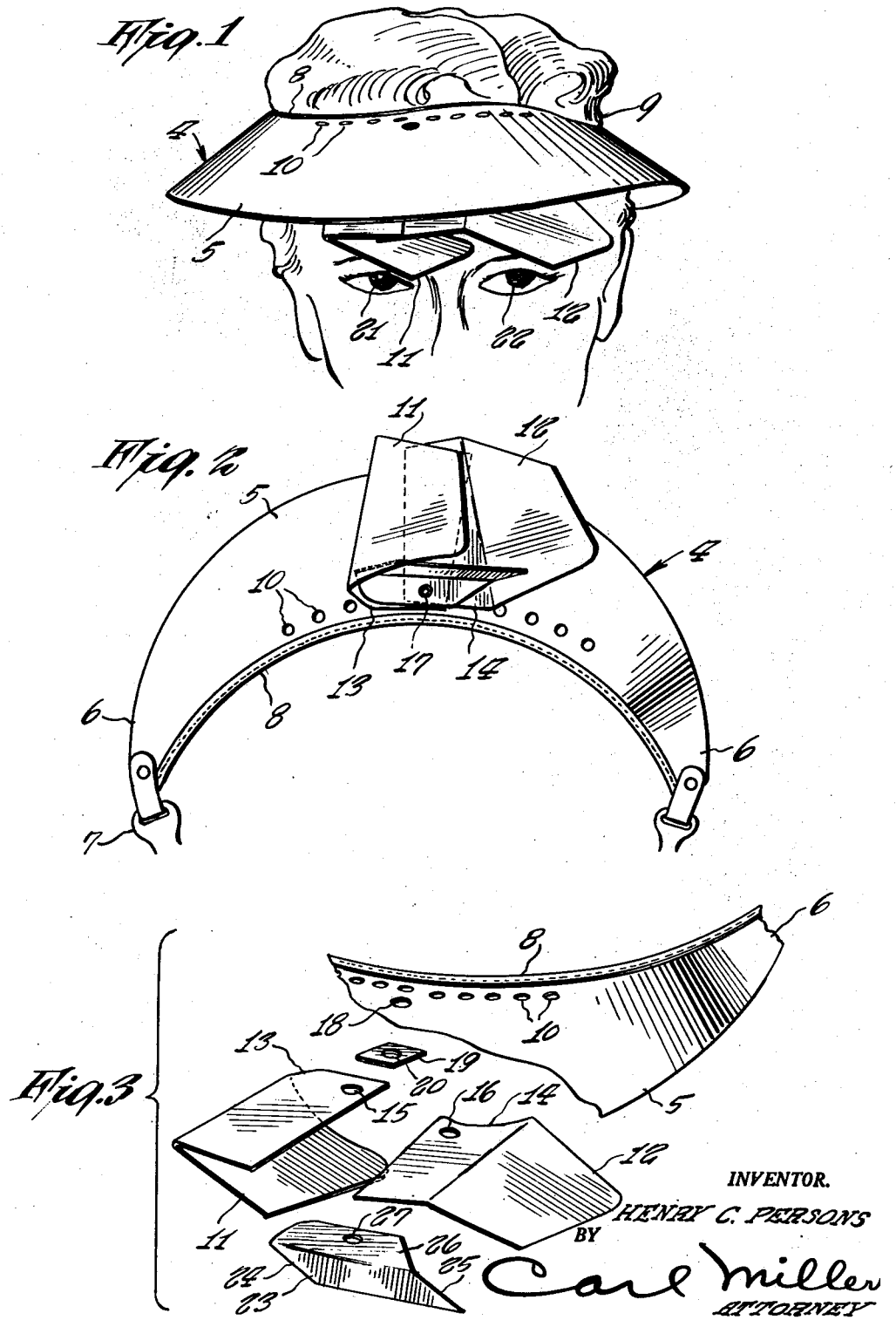
INVENTOR.
HENRY C. PERSONS
BY Carl Miller
ATTORNEY Patented July 22, 1952

2,603,784

UNITED STATES PATENT OFFICE 2,603,784

NIGHT VISOR BLACKOUT GLARE DEVICE

Henry C. Persons, Spartanburg, S. C.

Application September 22, 1951, Serial No. 247,840

5 Claims. (Cl. 2—12)

1

The present invention relates to eye shades, protectors and visors, and particularly to a night visor.

The main object of my invention is to protect the eyes of a motorist when driving at night so that he may drive safely, despite the glare of the lights on oncoming automobiles along the road.

Another object is to provide a special visor for the driver of an automobile that is readily placed in position upon the head, and yet unobtrusive while being disposed in convenient position to serve as a shield from glare of the headlights of other cars at all times.

A further object is to have such a protective visor that is substantially as effective in general use as a conventional eye shade, and in addition serves as a special protection from glare.

Yet another object is to have a night visor of the character indicated that includes a pair of opaque rigid shields secured upon a support forming a general visor, each shield protecting an eye of the driver so that neither eye suffers from exposure to glare of an approaching car, although the field of vision remains sufficient at the sides of the shields for normal driving.

It is, of course an object of the invention to produce a special night visor that is simple in construction and easy to use.

A practical object is also to make such a night visor light and low in cost in order to encourage wide distribution and thus increase safety of drivers and passengers in cars at night.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a front elevation of a night visor made according to the invention and embodying the same in a practical form, the visor being shown in position upon the head of a driver in approved location for actual use;

Figure 2 is an elevation of the same visor as seen from the bottom in Figure 1 in order to disclose details of construction; and Figure 3 is an exploded front perspective view of the various parts comprising the night visor of the preceding views.

In the above views, the same reference numerals indicate the same or like parts.

2

Everyone who drives is well aware of the difficulties that are encountered on the road at dusk and nightfall, due to the very strong headlights used by most motorists. The glare that is thus met from oncoming automobiles is so severe in many cases that it is substantially blinding and becomes a menace to safe driving. Various makeshifts have, of course been tried, but as yet, no good solution has appeared on the market or been generally adopted.

Upon considering this problem, it has occurred to me that it should be possible to shield the eyes in a selective manner against glare of approaching headlights, because these lights are, after all only small, limited points by comparison with the entire area to be viewed by the driver upon the road, and thus partial obturation of the field of view should suffice while the rest of this field remains open to the eyes. As a result, I have succeeded in producing a special night visor for this purpose, as will be described in the following.

Hence, in the practice of my invention, and referring again to the drawing, a conventional visor or eye shade, generally indicated at 4 primarily includes a crescent-shaped brim 5 of transparent, translucent or opaque material, usually cellulosic plastic. At the two narrowed ends 6, 6, this brim has a head strap or band 7 connected thereto for retaining the device on the head of the wearer in well known manner. The inner edge of the brim is provided with a reinforced edge material 8 to prevent any sharp cutting contact of the brim with the forehead, so that the whole may rest comfortably on the head 9 as best seen in Figure 1. The customary ventilation holes 10 may be provided within the reinforcing edge 8, if desired.

Thus far, the device may be more or less conventional, but forms the basis for the invention, and is combined with further features to constitute the invention as a whole. With this thought in mind, the brim is provided with a pair of baffle or shade members 11, 12 having the attaching tabs 13 and 14 pierced by holes 15, 16 for receiving a rivet or grommet 17 for securing them together. In the brim proper, a corresponding hole 18 is provided, while a perforate flat spacing washer 19 is also a part of the assembly and has a hole 20 for receiving a fastening member, as will be mentioned.

The two shade members 11 and 12 are inclined to one side or to the left when viewed as in Figures 1 and 2, and serve as double means for protecting the eyes 21, 22 from the glare of oncoming cars while allowing the driver to see everything else on the road, simply by turning his head very slightly and also averting it a little. Both of the shade members 11 and 12 will then screen the eyes effectively, one shade member being disposed at an inclined angle found best for the eye on that side, while the other shade member is disposed at nearly, if not quite the same angle as found best for the other eye. In order to ensure that both shade members remain in the selected positions at their special angles, a spacing member of any stiff material 23 with inclined edges 24, 25 is disposed between the shade members and is provided with an attachment tab 26 pierced by a hole 27 corresponding to holes 15, 16, 20 in members 13, 14 and 19.

The arrangement is such that when the parts are assembled, the flat spacing member 19 is first placed in position with its hole registering with hole 18 in brim 5, when tabs 13 and 14 are superposed in overlapping relation with their holes 15 and 16 registering with holes 20 and 18. Thereafter, tab 26 of spacing member 23 is placed over tabs 13 and 14 so that its hole 27 registers with the other holes 15, 16, 18 and 20. These parts are all located upon the underside of the brim, and finally a rivet or grommet 17 is inserted in registering holes and upset or riveted over to retain these parts assembled as by a single fastening means. The spacing member 19 allows the brim to retain its proper curvature although the tabs 13, 14 and 26 of parts 11, 12 and 23 are substantially flat, while the wide spacing member 23 may be turned to various positions about its grommet 17 to alter the spacing apart of shade members 11 and 12 to match differently spaced eyes of various drivers, when the grommet may be finally set with a final blow of a hammer, making certain that the parts are all in desired positions. The night visor is thus complete and ready for use. The shade members may be made of opaque or translucent material, as may be desired, and serve to eliminate glaring light coming from approaching automobiles from the eyes.

Manifestly, variations may be resorted to and parts and features may be modified or used without others within the scope of the appended claims.

Having now fully described my invention, I claim:

1. A night visor including a brim having a head band or strap for mounting the brim on the head of a driver, a pair of opaque shade members secured to the underside of the brim and depending therefrom at an acute angle toward one side in substantial parallelism below the forward edge of said brim, so that upon the head being slightly turned and averted, the shade members are shifted into obturing positions for protecting the eyes of the driver against headlight glare of oncoming automobiles.

2. A night visor according to claim 1, wherein each shade member has a pointed forward end with a wide obtuse angle and has a tab portion by which it is secured to the brim.

3. A night visor according to claim 1, wherein the shade members have attaching tabs by which they are secured to the brim, and a spacing member is secured between them to retain both shade members in mutually spaced and parallel relation.

4. A night visor according to claim 3, wherein the spacing member has an attaching tab also secured to the brim, and the side edges of said spacing member are cut at an inclined angle in substantial parallelism to make direct contact with the shade members and thereby space them apart in parallel relation.

5. A night visor according to claim 4, wherein the attaching tabs of the shade members and spacing member mutually overlap to a limited extent and have holes therein, and the brim has a corresponding hole registering with the holes in said tabs, and a rivet or grommet extends through the holes in the tabs and brim to retain said shade and spacing members assembled upon the brim.

HENRY C. PERSONS.

REFERENCES CITED

The following references are of record in the file of this patent:

UNITED STATES PATENTS

| Number | Name | Date |
| --- | --- | --- |
| 2,441,659 | Chalmers | May 18, 1948 |

FOREIGN PATENTS

| Number | Country | Date |
| --- | --- | --- |
| 290,771 | Great Britain | May 24, 1928 |